(No Model.)

K. ANUNSEN.
DRIVE WHEEL.

No. 250,701. Patented Dec. 13, 1881.

WITNESSES
INVENTOR
By his Attorneys,

UNITED STATES PATENT OFFICE.

KITTIL ANUNSEN, OF WINCHESTER, WISCONSIN.

DRIVE-WHEEL.

SPECIFICATION forming part of Letters Patent No. 250,701, dated December 13, 1881.

Application filed October 24, 1881. (No model.)

*To all whom it may concern:*

Be it known that I, KITTIL ANUNSEN, of Winchester, in the county of Winnebago and State of Wisconsin, have invented certain new and useful Improvements in Geared Drive-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1:
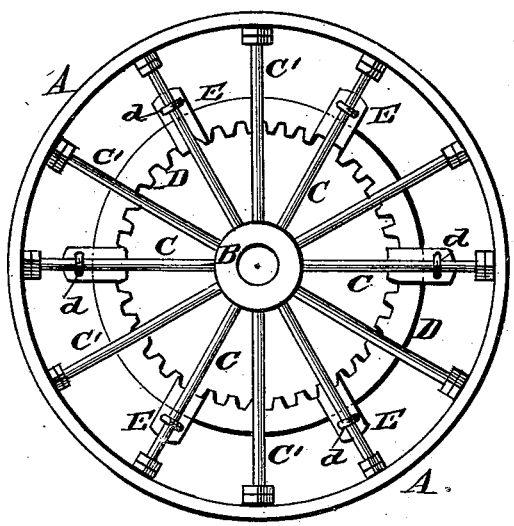
Figure 2:
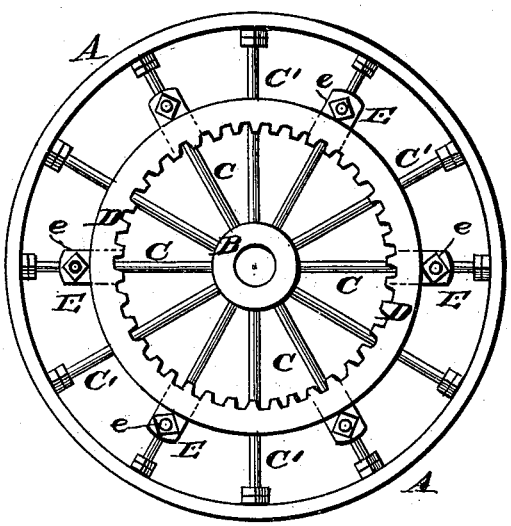
Figure 3:
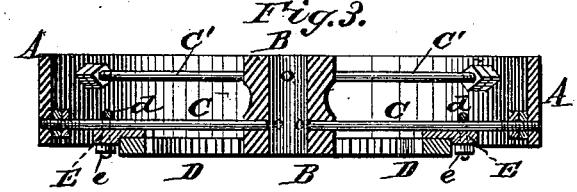
Figure 4:
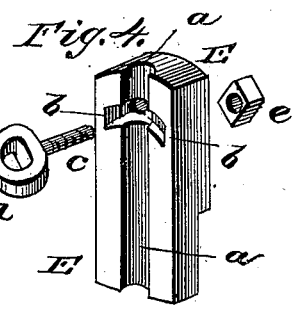

Figure 1 is a side elevation of my improved cogged or geared drive-wheel. Fig. 2 is a similar view representing the opposite side of the same. Fig. 3 is a diametrical section, and Fig. 4 is a perspective detail view, on an enlarged scale, of the device for affixing the sections of the internally-cogged gear-wheel upon the spokes of the main or drive wheel.

Similar letters of reference indicate corresponding parts in all the figures.

My invention has relation to internal gear-wheels which are secured concentrically upon the spokes of an outer drive-wheel, such as are used in operating horse-powers, harvesters, and many other classes of machinery, the exterior wheel being either in the nature of a pulley or traction-wheel; and it consists in an improved means for securing the inner concentric gear-wheel upon the spokes or radial arms of the outer drive-wheel, as hereinafter more fully set forth.

In the annexed drawings, A represents the rim or tread (as the case may be) of the drive or traction wheel, the central hub, B, of which has a double set of alternating radial arms or spokes, represented respectively by the letters C and C'. The internal gear-wheel, D, is secured upon the inner set of spokes, C, and said gear-wheel may either be cast in one piece or made in sections, which, when united, form the complete wheel. In either case the gear-wheel D is provided with a series of equidistant radial projections, E, coinciding with and corresponding in number to the spokes C. Each of these spurs or projections has a longitudinal groove or recess, *a*, in its rear side, (see Fig. 4,) which is crossed at right angles by a semicircular recess or depression, *b*. In placing the gear-wheel upon the spokes C these will fit into the longitudinal recesses *a*, and are held in place by bolts *c*, the eyes *d* of which are slipped upon the spokes before these are screwed into the outer rim or tread, A, and rest in the sockets or enlargements *b*, which intersect the grooves or spoke-recesses *a*, as hereinbefore described. The projecting threaded ends of the bolts *c* are nutted at *e*, to bind them against the inner faces of the projections E. In this manner it will be seen that I do not in any manner weaken the spokes upon which the gear-wheel is bolted, and that the latter is fixed firmly in its position, so that it cannot move to either way except with the spokes and wheel A; nor are there any bolts or nuts to interfere with the free and unobstructed meshing of the gear-wheel and its pinions operated by it, as the rim of the internal gear projects sufficiently out from the spokes to give free play to the gearing.

Having thus described my invention, I claim and desire to secure by Letters Patent of the United States—

The combination of the wheel A, having spokes C' C, concentric gear-wheel D, having radial projections E, provided with sockets or recesses *a b*, and eyebolts *c d*, nutted at *e*, substantially as and for the purpose herein shown and described.

In testimony that I claim the foregoing as my own I have hereto affixed my signature in presence of two witnesses.

KITTIL ANUNSEN.

Witnesses:
 LOUIS BAGGER,
 JNO. A. MADIGAN.